Nov. 20, 1951    R. G. NUCKOLLS    2,575,358
AUDIO LEVEL INDICATOR
Filed Aug. 9, 1946
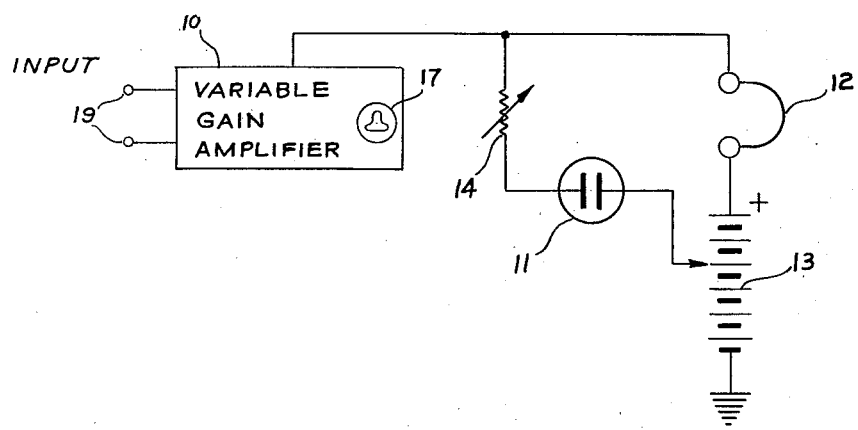
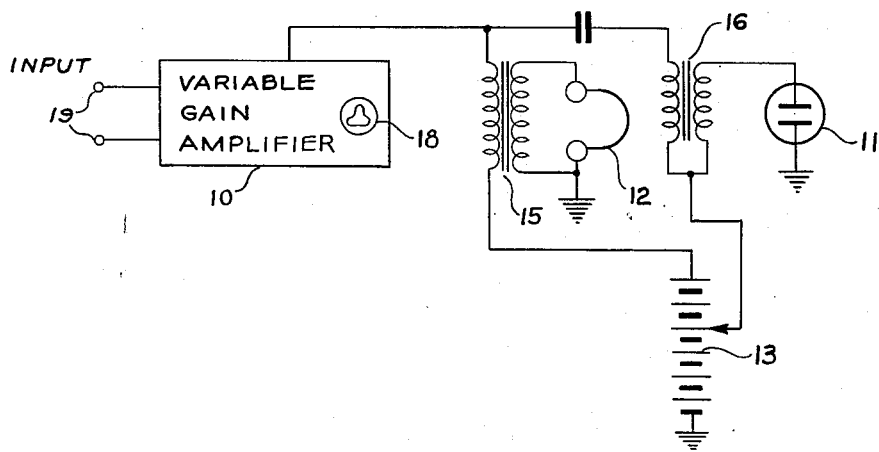
Inventor
RICHARD G. NUCKOLLS
By
Attorney Patented Nov. 20, 1951

2,575,358

UNITED STATES PATENT OFFICE 2,575,358

AUDIO LEVEL INDICATOR

Richard G. Nuckolls, Grinnell, Iowa

Application August 9, 1946, Serial No. 689,352

2 Claims. (Cl. 177—311)

(Granted under the act of March 3, 1883, as amended April 30, 1928; 370 O. G. 757)

This invention relates to an indicating circuit and more particularly to a circuit for indicating the amplitude level of an audio frequency signal.

It is an object of this invention to provide a circuit which will give an audible indication of any signal above a preselected amplitude.

It is a further object of this invention to provide a circuit for comparing the peak amplitude level of different audio frequency signals.

Other objects and advantages of the invention will be apparent from the following detailed description when taken in conjunction with the accompanying drawings which illustrate preferred embodiments of the invention, and in which:

Fig. 1 is a circuit diagram showing one embodiment of the invention, and

Fig. 2 is a circuit diagram of another embodiment of the invention.

In accordance with the present invention, a circuit is contemplated which will allow the amplitude levels of all signals to be compared. Additionally, the circuit may be arranged such that a minimum level of amplitude measurement or comparison is established and only signals having an amplitude greater than this minimum level will be able to be measured or compared. A voltage breakdown device, such as a neon bulb is proposed as the means whereby the above mentioned minimum amplitude level may be established. For voltages below a certain value, the neon bulb will not conduct, but for signals of greater amplitude a surge current will flow through the bulb and will cause an audible signal to be heard in a pair of headphones which are connected in parallel with the bulb. By placing a power supply having a variable voltage output in series with the bulb, the amplitude level of the signal necessary to cause a surge current to flow through the bulb may be adjusted.

In Fig. 1, to which reference is now had, there is shown an embodiment of the invention, comprising a variable-gain amplifier 10, a neon bulb 11 connected to the output of the amplifier 10, a pair of phones 12 and a power supply 13 which extends from the low side of the neon bulb 11 to ground. A suitable resistance 14 is connected in series with the neon bulb to limit the current through the neon bulb and the headphones 12 are in parallel with the combination of the neon bulb 11 and the resistance 14. Assume now that an audio frequency signal is introduced to the input 19 of the amplifier 10, which will be maintained at constant gain. If the peak amplitude of the signal is not sufficiently large, tube 11 will not conduct. However, a completed path will be presented to the signal through the amplifier 10 and the headphones 12, thus allowing the signal to be heard in the headphones 12. If, however, the signal introduced to the input of the amplifier 10 is sufficiently large to cause the neon bulb 11 to conduct, the resulting surge current will produce a surge voltage across the resistance 14 and neon bulb 11, which voltage will also appear across the headphones 12 and cause a signal having a characteristic "popping" noise to be heard in the headphones. By placing the power supply 13 in series with the neon bulb 11 and the resistance 14, the amplitude of the signal required to break down the bulb 11 may be varied, depending upon the value of the voltage from the supply 13. Additionally, the gain of the amplifier 10 may be varied for each signal by means of the gain control 17 such that the signal will be barely audible in the headphones 12. In this way, the peak amplitude of different signals may be compared by noting the position of the variable gain control for each signal.

Fig. 2 shows an alternate embodiment of the invention. In addition to the variable gain amplifier 10, the neon bulb 11, the headphones 12 and the power supply 13, a matching transformer 15 and a step-up transformer 16 are also included. The output from the variable gain amplifier is introduced to the primary windings of the transformers 15 and 16, both of which windings are in parallel. The secondary of the transformer 15 is connected to the headphones 12, while the neon bulb 11 serves as the load for the secondary of the transformer 16 and is connected from one side of the transformer 16 secondary to ground. One side of the primary and secondary windings of transformer 16 are connected together and to the power supply 13. As with the circuit shown in Fig. 1, a signal having an insufficient peak amplitude to break down the neon bulb 11 will still be heard in the headphone 12. If, however, the signal is sufficiently strong to cause the bulb 11 to conduct, the resulting current will flow in the windings of the transformer 16. Thus, a resultant voltage will appear across the primary winding of the transformer 16 and this same voltage will appear across the primary winding of the transformer 15, since the two primary windings are in parallel. A surge current of sufficient strength to cause an audible sound similar to the surge of noise described in connection with Fig. 1 to emanate from the headphones will now be obtained. As in Fig. 1, the minimum amplitude level of the surge signal which will be heard in the headphones will be made dependent upon the value of voltage from the power supply 13. In Fig. 1, an increase in the value of the positive voltage supplied to the tube 11 from the tap on supply 13 necessitates a signal of greater peak amplitude to cause conduction. In Fig. 2, an increase in the value of the positive voltage supplied to the tube 11 from the tap on supply 13 will permit conduction by tube 11 for a smaller peak signal amplitude. Additionally, the circuit of Fig. 2 is similar to that shown in Fig. 1 in that the gain of the amplifier 10 may be varied by means of the gain control 18 for each signal such that the surge signal will be barely audible in the headphones 12. In this way, the peak amplitude of different signals may be compared by noting the position of the variable gain control for each signal.

While certain preferred embodiments of this invention have been described, it is realized that many modifications and variations of this invention may be made and no limitations upon this invention are intended other than may be imposed by the scope of the appended claims.

The invention described herein may be manufactured and used by or for the Government of the United States of America for governmental purposes without the payment of any royalties thereon or therefor.

What is claimed is:

1. A circuit for indicating the amplitude level of an audio frequency signal comprising, an amplifier, a voltage breakdown means connected to the output of said amplifier said last named means being arranged to conduct in response to signals having an amplitude greater than a specified amplitude, and an audio reproducing means coupled in parallel across said last named means whereby conduction by said voltage breakdown means may be detected.

2. A circuit for indicating the amplitude level of an audio frequency signal comprising, an amplifier, a transformer having a primary and secondary winding with two terminals on each winding, a power supply connected to a terminal of the primary and secondary windings, the second terminal of said primary winding connected to the output of said amplifier stage, a neon bulb connected between the second terminal of said secondary winding and ground, a second transformer having a primary and secondary winding, the primary winding of said second transformer connected in parallel with the primary winding of said first transformer, and a pair of headphones connected to the secondary of said second transformer.

RICHARD G. NUCKOLLS.

REFERENCES CITED

The following references are of record in the file of this patent:

UNITED STATES PATENTS

| Number | Name | Date |
|---|---|---|
| 1,635,779 | Carter | July 12, 1927 |
| 2,128,395 | Berndt et al. | Aug. 30, 1938 |
| 2,394,573 | Walsh et al. | Feb. 12, 1946 |
| 2,395,368 | Bull | Feb. 19, 1946 |